May 20, 1930.  R. G. MANSFIELD  1,759,126
HEAT INTERCHANGER
Filed April 2, 1926   3 Sheets-Sheet 1

Ralph G. Mansfield
INVENTOR.

BY Byrnes Townsend Anckenstein
ATTORNEYS.

May 20, 1930.   R. G. MANSFIELD   1,759,126
HEAT INTERCHANGER
Filed April 2, 1926    3 Sheets-Sheet 2
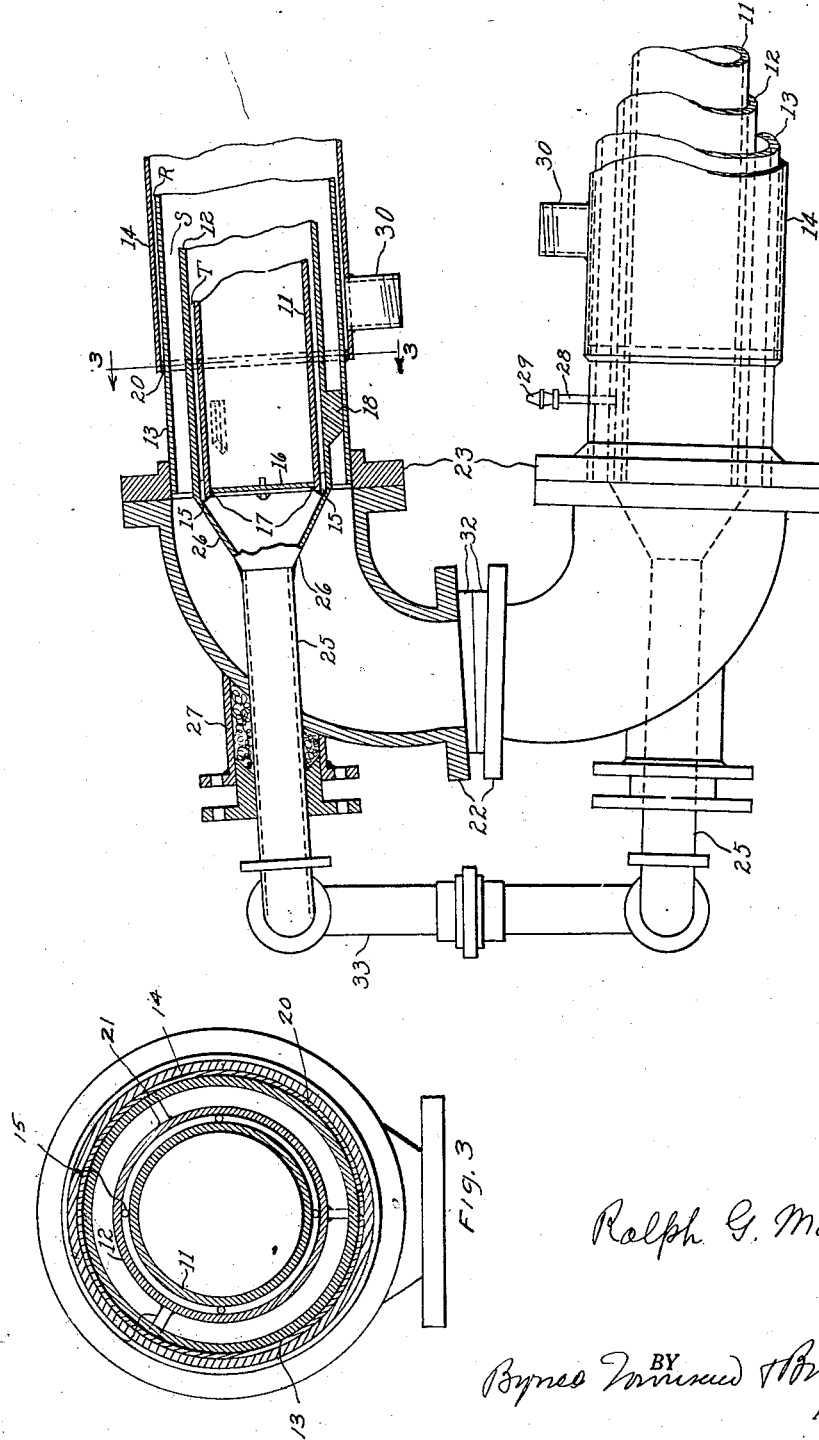
Ralph G. Mansfield
INVENTOR.
BY
ATTORNEYS.

Patented May 20, 1930

1,759,126

UNITED STATES PATENT OFFICE

RALPH G. MANSFIELD, OF LA SALLE, NEW YORK, ASSIGNOR TO UNION CARBIDE COMPANY, A CORPORATION OF VIRGINIA

HEAT INTERCHANGER

Application filed April 2, 1926. Serial No. 99,378.

This invention relates to heat interchangers and in particular to those of the single circuit or single pass type. While capable of many uses, such for example as a condenser or feed water heater, the improved interchanger is especially adapted for use in the manufacture and treatment of chemicals. An example of such use is found in the manufacture of urea from calcium cyanamide by the process described in the United States patents to Lidholm Nos. 1,436,180; 1,444,255 and 1,444,256.

In many chemical processes it is necessary to treat sludges or slurries or solutions, the composition of which is such that they tend to become viscous or harden or to adhere to the walls of the conduit and thus clog the relatively narrow passages which are necessary for efficient uniform heating or cooling, as the case may be.

In the multiple circuit heat interchangers generally used, it is difficult to maintain uniform temperatures and pressures because of variations of resistance to flow in the several passages. As a result of these variations, solutions or sludges become more viscous, or the tendency to adhere to walls is greater, in some passages than in others,—the velocity decreasing with increasing friction. This accumulative effect finally results in restricted passages becoming almost or entirely clogged up. This has been known to occur and in certain instances deleterious reactions take place. These deleterious reactions may be a function of time or temperature or both and would ruin the entire batch when the arrested flow is released. The temperature probably varies because the rate of heat transfer varies with the velocity of flow. Uniformity of flow is a prime requisite with solutions, the temperature of which must be maintained at the proper degree. Certain desired reactions, for example, occur only at definite temperatures within close limits.

Furthermore it sometimes happens that chemical plants are not situated in localities having unlimited supplies of cooling water and where the temperature differential between the fluid to be cooled and the cooling media is low it is especially desirable to take advantage of those factors that make for the most efficient heat transfer. It is well known that as the velocity of the cooling media and the fluid to be cooled is increased, the rate of heat transfer is increased. The areas of the passages are, therefore, made relatively small in order that the velocities of the fluids may be increased as is consistent with good design to obtain more efficient heat interchange.

The principal object of my invention is to devise a heat interchanger which shall effect an efficient heat interchange and maintain a low temperature differential between fluids; which will not be subject to clogging; which will have concentric fluid passages of substantially uniform cross-sectional areas throughout their lengths; and in which the flow of liquid to be treated will be maintained at a substantially constant velocity. Another object of this invention is to provide a construction which may serve the double purpose of a heat interchanger and piping to carry solutions or fluids from one apparatus to another. Another object of my invention is to produce a device in which the heating or cooling fluid passages are of relatively small area so the interchanger will be efficient in the use of temperature changing medium or fluid. A further object of my invention is to provide a heat interchanger in which standard parts may be used to a greater extent than has hitherto been practicable.

These and other objects of my invention are disclosed in the following specification having reference to the accompanying drawings, in which:

Fig. 2 is an elevation, half in section, of a detail of the device shown in Fig. 1;

Fig. 3 is a section taken on the line III—III of Fig. 2;

The improved heat interchanger may consist of a single unit or a number of similar interchanger units connected in series; which may be installed vertically, horizontally, or inclined, depending upon the particular place and purpose of use. Each unit has a passage for the fluid composition to be treated, e. g., heated or cooled; which fluid passage is disposed between and in heat-interchanging relation to co-extensive passages for heating or cooling medium, such as steam or water. According to this invention the three passages are preferably concentrically arranged so that the cooling or heating medium may be conveniently applied to the inner and outer walls of the intermediate passage; and each of the several annular passages is thin and of substantially the same area throughout its length. Moreover, each of the passages is thin as compared with its circumference or its width dimension transversely of the direction of flow of the fluids therethrough, whereby the fluids will be spread out in wide shallow streams. Consequently, the velocities of the several fluids and the rate of heat transference through both walls of the intermediate passage may be readily controlled so as to maintain a low temperature differential between the fluid in the intermediate passage and the cooling or heating medium, and at the same time greatly reduce the tendency of the treated fluid to adhere to the walls of its conduit to avoid clogging the latter. Inasmuch as the principles of this invention may be applied in a variety of ways, it is to be understood that the herein-disclosed embodiments only illustrate two of the more important applications of such principles.

Figure 1:
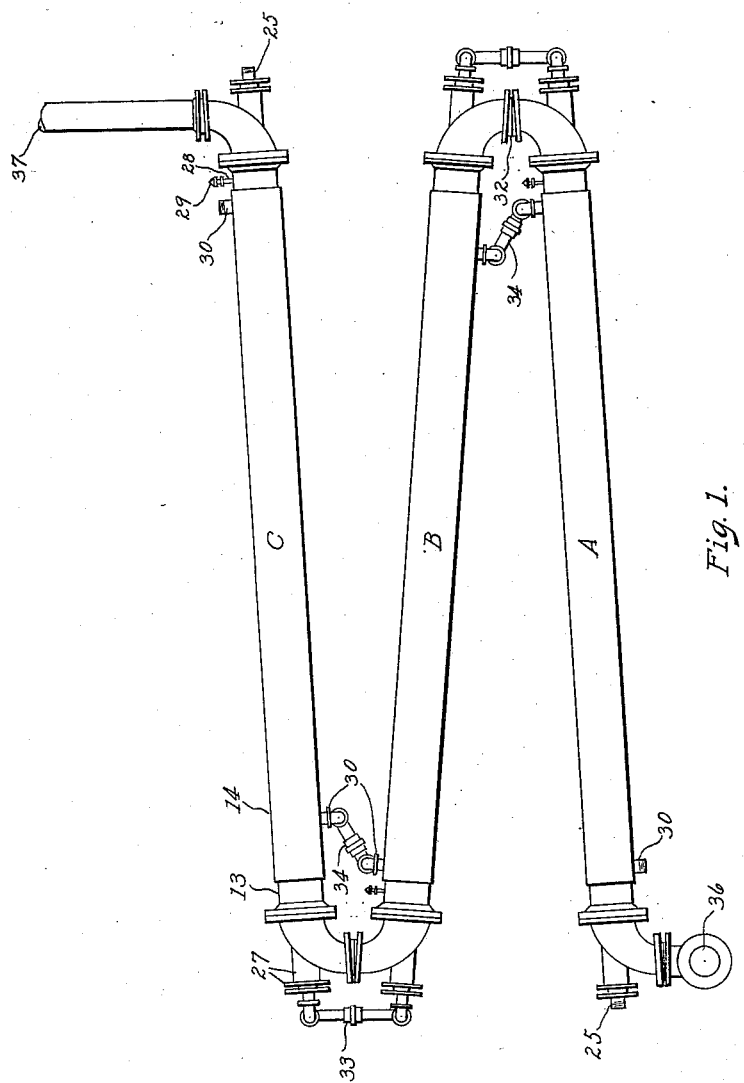
Fig. 1 is an elevation of an interchanger constructed in accordance with my invention.

Referring to Figs. 1 to 3 inclusive, I show an interchanger composed of three units A, B, and C. These units are similar in construction, each unit comprising four cylinders 11, 12, 13 and 14, which are preferably pipes of suitable size, but may be otherwise formed. The cylinders are arranged within one another and are preferably substantially concentric so that the cross-sectional area of each of the three annular passages R, S and T thus provided will be substantially uniform throughout its length and the cross sectional area of the passages R and T will be substantially equal to each other. The construction of a unit of the interchanger and the connections between two units are shown in detail in Fig. 2. It will be understood that both ends of the units are substantially similar to the one shown in section in Fig. 2.

The inner cylinder 11 is disposed concentrically within the cylinder 12, being held in place by spacing pins 15 at each end, which may be welded to the cylinders 11 and 12. Each end of the cylinder 11 is closed, as by a plate 16 welded thereto at 17 so as to provide a core inside the cylinder 12 to form the interior annular conduit or passage T for temperature changing fluid. Each end of the cylinder 12 is secured to and spaced from the cylinder 13, as by spacer bars 18, to form the intermediate annular conduit or passage S for the fluid or substance to be treated. Each end of the cylinder 14 is united to and spaced from the cylinder 13, as by a spacing ring 20, which closes the opposite ends of the exterior annular conduit or passage R for heating or cooling fluid. It will be noted that the three conduits R, S and T are thin and measured circumferentially each is many times as wide as it is thick. In assembling the cylinders 12 and 13, the spacer bars are welded to the cylinder 12 before it is inserted in the cylinder 13. The cylinder 13 is provided with slots opposite the position which the spacer bars 18 are to occupy and when these members are in their final position this slot is filled with weld metal 21, thus securing the spacer bars 18 to the cylinder 13.

The fluid to be treated may be conducted to and away from the passage S by reducing elbows 22, each of which has end flanges whereby it may be secured to a similar elbow on an adjoining unit and to a flange 23 welded or otherwise secured to the cylinder 13. I have found that by using 6" and 8" diameter standard steel pipe for the cylinders 12 and 13, respectively, and using a reducing elbow tapering from 8" to 5" diameter the cross-sectional area of the small end of the elbow will be substantially the same as the area of passage S, but I do not wish to be limited to these dimensions. Cooling or heating fluid may be conducted to and away from the inner passage T by pipes 25 terminating at their inner ends in cones 26 which are welded or otherwise secured to the ends of the cylinder 12. Each pipe 25 is axially in line with the cylinder 12 and projects through a suitable stuffing box 27 on the curved wall of the adjacent elbow. In order to prevent the passage T from becoming air bound, a vent pipe 28 may be provided which opens into the passage T and extends through cylinders 12 and 13, terminating at its outer end in a pet cock 29. Inlet and outlet nipples 30 are welded or otherwise secured adjacent the opposite ends of the pipe 14 for conducting cooling or heating fluid to and from the outer passage R.

Each unit is a complete heat interchanger in itself, but it is frequently desirable or necessary to use a number of such units coupled in series to attain the required final temperature for the treated fluid, or to treat the same for the required length of time, and to utilize the interchanger as piping to conduct such fluid from one treating apparatus to another. For such connection, a plurality of units may be assembled as shown in Figs. 1 and 4, for example.

In the assembly shown in Fig. 1, the units are assembled end to end in zig-zag fashion, the smaller ends of the reducing elbows being suitably coupled together with annular wedges 32 between their flanges, so that the units will be disposed at an angle to one another to render the connections between them more accessible and so that the interchanger may bridge the space between one apparatus and another and thus also serve as piping for conveying the treated fluid between such apparatuses while it is being cooled or heated. The outer ends of the pipes 25 in such elbows are connected by suitable piping 33; and the adjacent nipples 30 are connected by suitable piping 34. The sludge or other fluid matter to be treated enters this plural-unit interchanger at the inlet 36, passing through the first elbow, then through the first conduit S, then through the connected elbows at the opposite end of the first unit to the second conduit S in the second unit, and so on through the remaining units to the discharge outlet pipe 37 at the end of the last unit. The cooling or heating medium for the inner conduits T may enter the interchanger at the inlet pipe 25 in the first elbow adjacent the sludge inlet 36, and then flows successively through the inner conduits T and the outer connections 33 until it is discharged from the pipe 25 in the last elbow having the sludge outlet 37. The cooling or heating medium for the several outer conduits R may enter the interchanger at the first nipple 30 adjacent the sludge inlet 36, then flows successively through the outer conduits R and nipple connections 34, and finally discharges at the last nipple near the sludge outlet 37.

Figure 4:
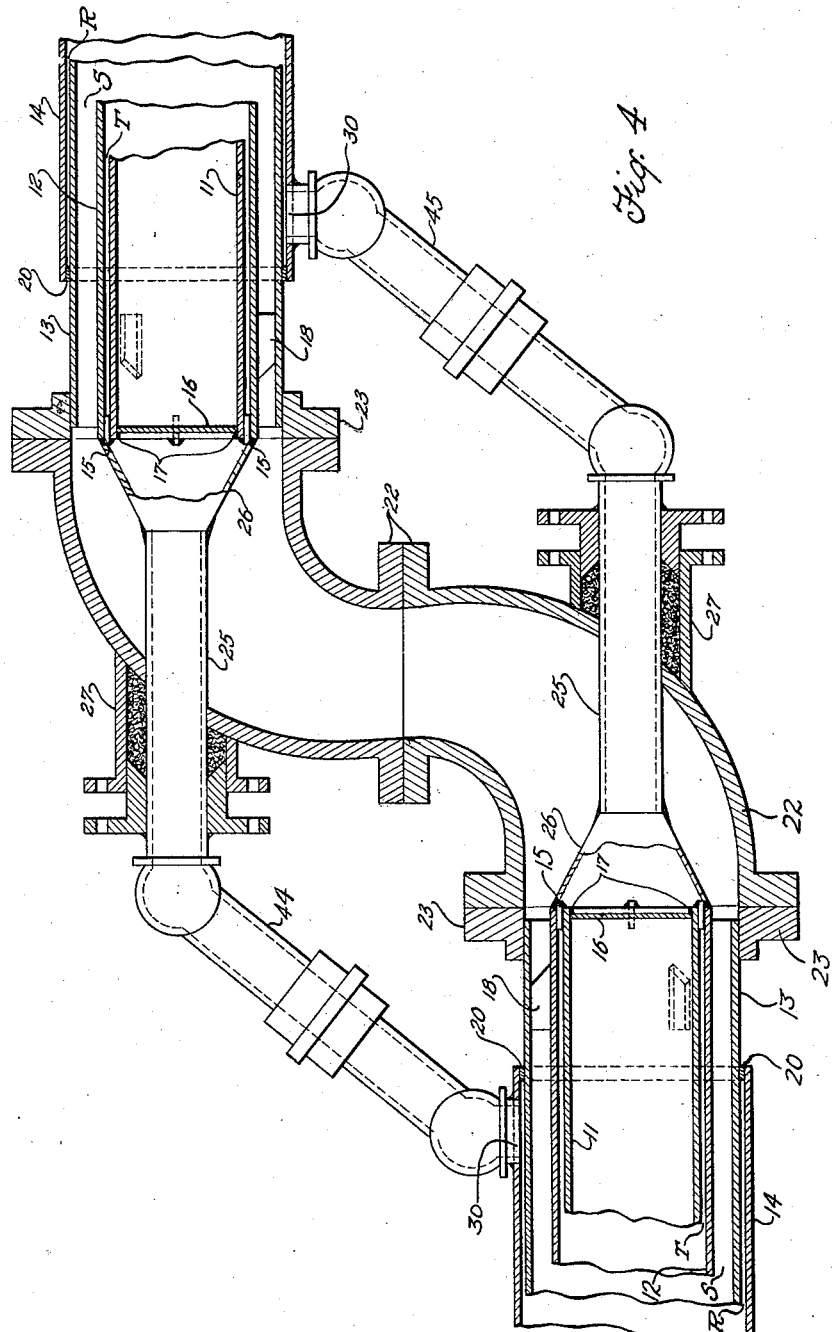
Fig. 4 is a sectional view showing another arrangement of the units comprising an interchanger constructed in accordance with my invention.

The interchanger shown in Fig. 4 is designed to serve the double purpose of a cooler or heater and piping to conduct the treated fluid from one apparatus to another; and to this end the required number of units, similar to those shown in Fig. 2, are coupled end to end, slightly offset from one another but substantially in line since alternate units may be in coaxial relation. In this interchanger, the sludge may enter the inlet at the end of one unit and flow successively through the conduits S and connecting elbows, the latter being coupled together so their larger ends face in opposite directions. While the conduits R and T may also be severally connected in series in a manner similar to the connections in Fig. 1, it is more advantageous and simplifies the piping to connect the discharge nipple 30 of the first unit to the inlet pipe 25 of the second unit, as by piping 44; and to connect the discharge pipe 25 of the first unit to the inlet nipple 30 of the second unit, as by piping 45. The cross-sectional area of the passage R is approximately equal to the area of passage T and also to the area of each of the connecting pipes 44 and 45. Accordingly, the heat transferring medium that enters the inner conduit T of the first unit is discharged into the outer conduit R of the second unit and from there into the inner conduit of the next, and so on; and, similarly, the heat transferring medium that enters the outer conduit R of the first unit flows into the inner conduit of the second, then into the outer conduit of the third, and so on until it discharges from the interchanger.

The simple construction described lends itself to a wide variation of capacities, volumes and temperature differentials. The proportions of parts, materials of construction, areas of passages, velocities of solutions and the particular temperature-changing fluids for various temperature differentials and capacities are, of course, based upon established engineering practice and data. While the cooling or heating medium and the fluid to be treated are herein described as flowing through the interchanger in the same general direction so as to have concurrent circulation; it is obvious, of course, that counter current circulation may be effected by causing either or both of the temperature changing media or the fluid to be treated to flow in the opposite direction. Numerous other changes may be made in the interchangers shown without departing from the principles of this invention or sacrificing its advantages.

I claim:

1. A heat interchanger comprising a plurality of units coupled in series, each unit comprising passages for temperature changing media and a passage intermediate such passages for the fluid to be treated, means at the ends of each unit for connecting said intermediate passages of adjacent units and means for connecting each passage for temperature changing media of one unit to the passage for temperature changing media of an adjacent unit on the opposite side of said intermediate passage.

2. A heat interchanger comprising a plurality of units coupled in series, each unit comprising an intermediate passage of annular cross section for fluid to be treated, the inner wall of said passage forming the outer wall of an internal passage and the outer wall of said first mentioned passage forming the inner wall of an external passage, means connecting the intermediate passage for fluid to be treated of one unit to the corresponding passages of adjacent units and means connecting the external passage of each unit to the internal passages of the adjacent units.

3. A heat interchanger according to claim 2 wherein the internal and external passages are of equivalent cross sectional area.

4. A heat interchanger according to claim 2 wherein the internal and external passages are of equivalent cross sectional area and the means connecting the passages of adjacent units have the same cross sectional area as the passages so connected.

In testimony whereof, I affix my signature.

RALPH G. MANSFIELD.